United States Patent [19]
Moro et al.

[11] Patent Number: 5,638,188
[45] Date of Patent: Jun. 10, 1997

[54] IMAGE PROCESSING METHOD AND APPARATUS WITH STORING AND SELECTING OF DOT PATTERNS

[75] Inventors: Takahiro Moro, Shiki; Katsumi Masaki, Yokohama; Takafumi Sawaki, Kawasaki; Atsushi Ushiroda, Machida, all of Japan

[73] Assignee: Canon Kabushiki Kaisha, Tokyo, Japan

[21] Appl. No.: 276,807

[22] Filed: Jul. 18, 1994

[30] Foreign Application Priority Data

Jul. 19, 1993 [JP] Japan .................................. 5-178144

[51] Int. Cl.$^6$ ............................................ G06K 9/00
[52] U.S. Cl. ................................. 358/456; 358/298
[58] Field of Search ................................. 382/252, 299, 382/232, 236, 238, 239, 266, 267, 268, 269, 274, 275, 276, 307, 309; 358/456, 457, 451, 463, 534, 535, 532, 298

[56] References Cited

U.S. PATENT DOCUMENTS

| | | | |
|---|---|---|---|
| 4,742,553 | 5/1988 | Irwin | 382/47 |
| 4,876,610 | 10/1989 | Ohsawa et al. | 358/443 |
| 4,876,611 | 10/1989 | Fischer et al. | 358/456 |
| 4,878,125 | 10/1989 | Katayama et al. | 358/443 |
| 4,920,501 | 4/1990 | Sullivan et al. | 364/518 |
| 4,926,251 | 5/1990 | Sekizawa et al. | 358/75 |
| 4,958,236 | 9/1990 | Nagashima et al. | 358/445 |
| 4,958,238 | 9/1990 | Katayama et al. | 358/456 |
| 4,975,786 | 12/1990 | Katayama et al. | 358/459 |
| 5,008,950 | 4/1991 | Katayama et al. | 382/50 |
| 5,086,484 | 2/1992 | Katayama et al. | 382/50 |
| 5,101,283 | 3/1992 | Seki et al. | 358/456 |
| 5,140,431 | 8/1992 | Cardillo | 358/298 |
| 5,187,592 | 2/1993 | Sugiyama et al. | 358/430 |

Primary Examiner—Joseph Mancuso
Assistant Examiner—Bijan Tadayon
Attorney, Agent, or Firm—Fitzpatrick, Cella, Harper & Scinto

[57] ABSTRACT

An image processing apparatus of a digital copying apparatus, digital facsimile, printer, or the like comprises an input unit to input multi-level data, an arithmetic operation circuit for adding error data to the input multi-level data and calculating error correction data, a selector to select a predetermined dot pattern on the basis of the error correction data, an error calculation circuit to calculate a difference between a representative value for each dot pattern and the error correction data; and a storing circuit for storing the difference as error data into a memory. The selector comprises a level classification threshold value storage memory in which threshold values to classify the error correction data into levels have been stored, and a data level determination circuit for classifying the error correction data into levels on the basis of the value of the error correction data and the value stored in the level classification threshold value storage memory.

18 Claims, 14 Drawing Sheets

FIG. 2

| DATA LEVEL | DENSITY f (i, j) |
|---|---|
| 0 | -8 ≦ f (i, j) < 8 |
| 1 | 8 ≦ f (i, j) < 24 |
| 2 | 24 ≦ f (i, j) < 40 |
| 3 | 40 ≦ f (i, j) < 56 |
| 4 | 56 ≦ f (i, j) < 72 |
| 5 | 72 ≦ f (i, j) < 88 |
| 6 | 88 ≦ f (i, j) < 104 |
| 7 | 104 ≦ f (i, j) < 120 |
| 8 | 120 ≦ f (i, j) < 136 |
| 9 | 136 ≦ f (i, j) < 152 |
| 10 | 152 ≦ f (i, j) < 168 |
| 11 | 168 ≦ f (i, j) < 184 |
| 12 | 184 ≦ f (i, j) < 200 |
| 13 | 200 ≦ f (i, j) < 216 |
| 14 | 216 ≦ f (i, j) < 232 |
| 15 | 232 ≦ f (i, j) < 248 |
| 16 | 248 ≦ f (i, j) < 264 |

FIG. 3
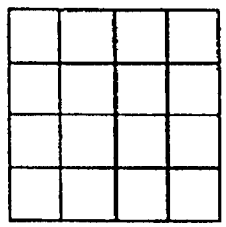
LEVEL 0
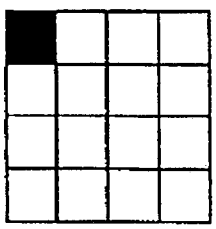
LEVEL 1
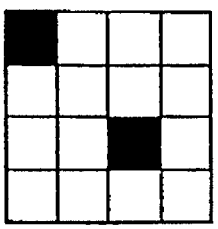
LEVEL 2
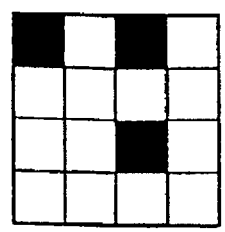
LEVEL 3
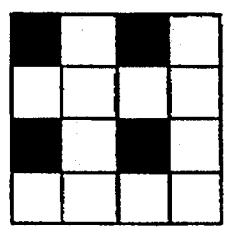
LEVEL 4
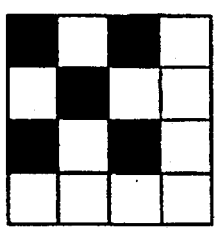
LEVEL 5
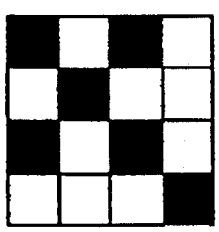
LEVEL 6
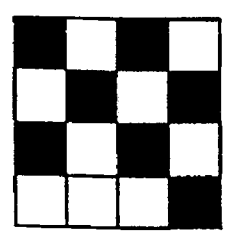
LEVEL 7
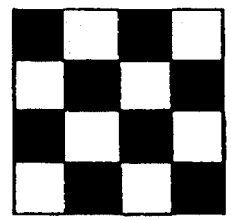
LEVEL 8
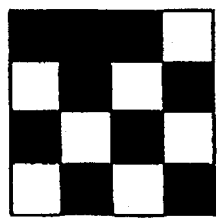
LEVEL 9
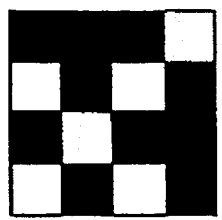
LEVEL 10
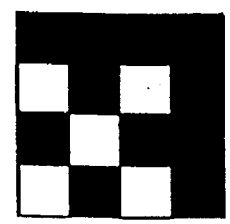
LEVEL 11
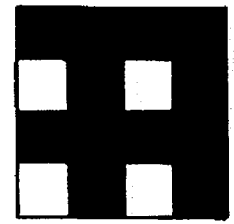
LEVEL 12
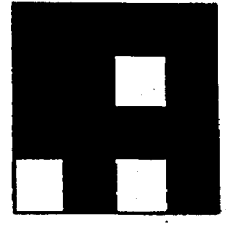
LEVEL 13
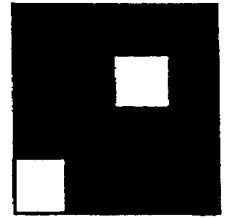
LEVEL 14
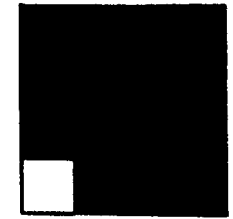
LEVEL 15
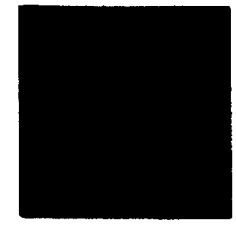
LEVEL 16

FIG. 4

| DATA LEVEL | THRESHOLD VALUE FOR EACH LEVEL |
|---|---|
| 0 | 0 |
| 1 | 16 |
| 2 | 32 |
| 3 | 48 |
| 4 | 64 |
| 5 | 80 |
| 6 | 96 |
| 7 | 112 |
| 8 | 128 |
| 9 | 144 |
| 10 | 160 |
| 11 | 176 |
| 12 | 192 |
| 13 | 208 |
| 14 | 224 |
| 15 | 240 |
| 16 | 256 |

FIG. 6
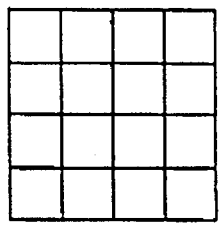 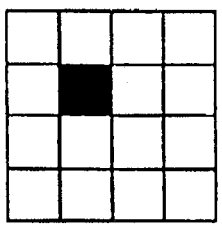 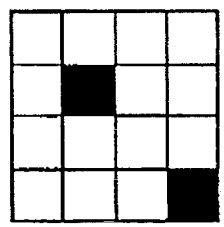 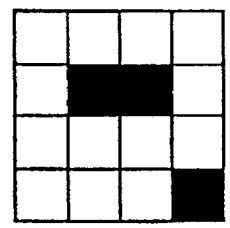
PATTERN 0   PATTERN 1   PATTERN 2   PATTERN 3
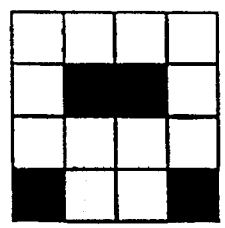 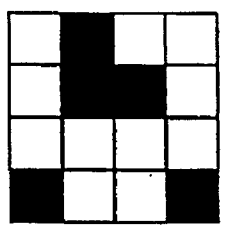 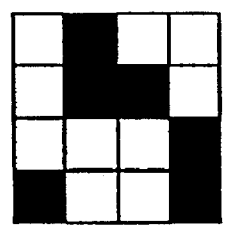 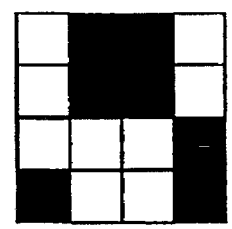
PATTERN 4   PATTERN 5   PATTERN 6   PATTERN 7
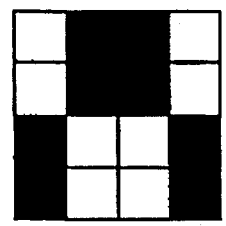 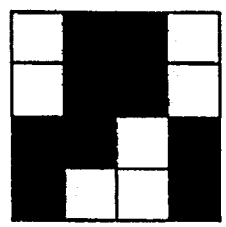 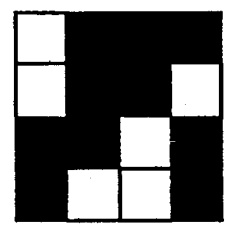 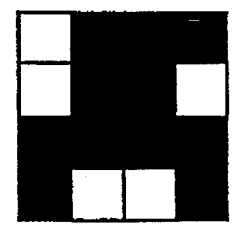
PATTERN 8   PATTERN 9   PATTERN 10   PATTERN 11
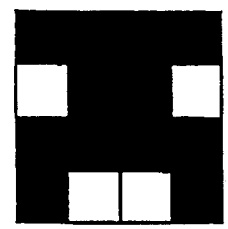   
PATTERN 12   PATTERN 13   PATTERN 14   PATTERN 15
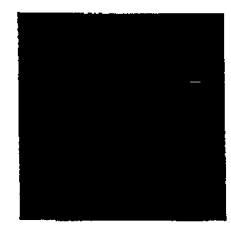
PATTERN 16

FIG. 8
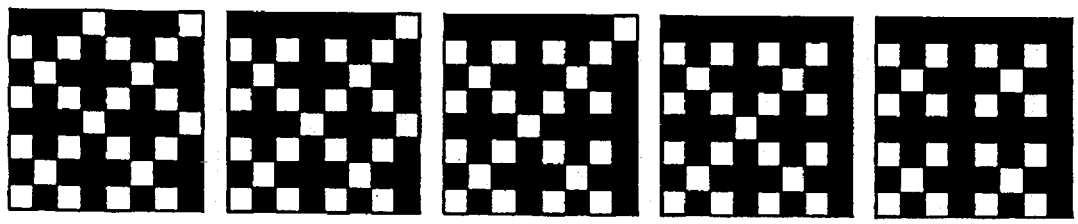
PATTERN 40  PATTERN 41  PATTERN 42  PATTERN 43  PATTERN 44
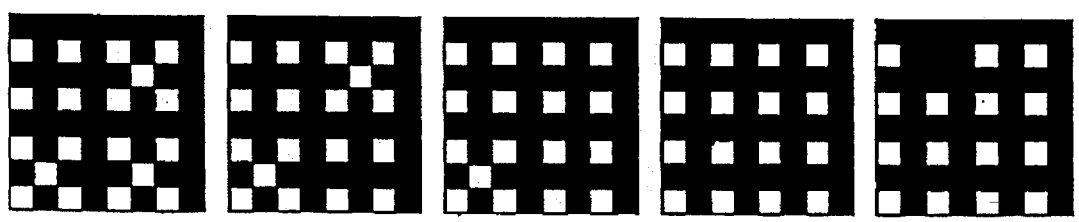
PATTERN 45  PATTERN 46  PATTERN 47  PATTERN 48  PATTERN 49
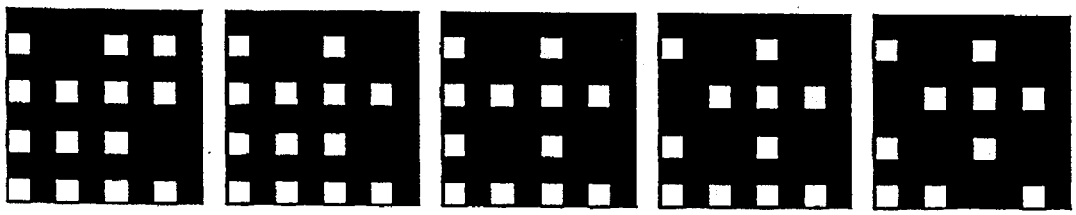
PATTERN 50  PATTERN 51  PATTERN 52  PATTERN 53  PATTERN 54
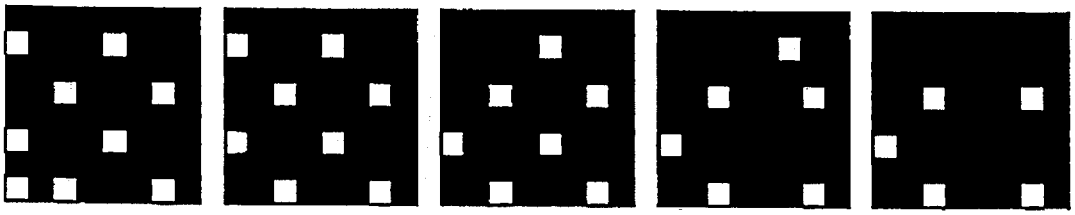
PATTERN 55  PATTERN 56  PATTERN 57  PATTERN 58  PATTERN 59
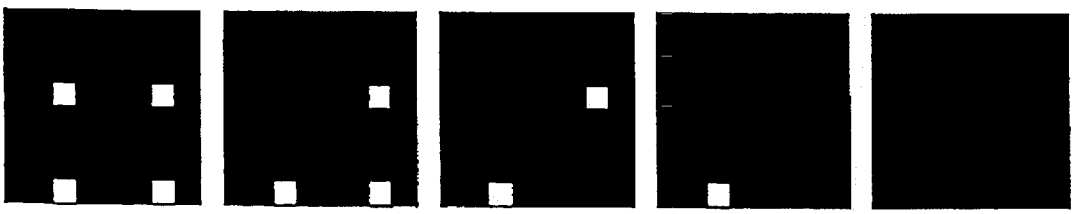
PATTERN 60  PATTERN 61  PATTERN 62  PATTERN 63  PATTERN 64

FIG. 9

| DATA LEVEL | DENSITY f (i, j) | DATA LEVEL | DENSITY f (i, j) | DATA LEVEL | DENSITY f (i, j) |
|---|---|---|---|---|---|
| 0 | $0 \leq f(i,j) < 4$ | 25 | $100 \leq f(i,j) < 104$ | 50 | $200 \leq f(i,j) < 204$ |
| 1 | $4 \leq f(i,j) < 8$ | 26 | $104 \leq f(i,j) < 108$ | 51 | $204 \leq f(i,j) < 208$ |
| 2 | $8 \leq f(i,j) < 12$ | 27 | $108 \leq f(i,j) < 112$ | 52 | $208 \leq f(i,j) < 212$ |
| 3 | $12 \leq f(i,j) < 16$ | 28 | $112 \leq f(i,j) < 116$ | 53 | $212 \leq f(i,j) < 216$ |
| 4 | $16 \leq f(i,j) < 20$ | 29 | $116 \leq f(i,j) < 120$ | 54 | $216 \leq f(i,j) < 220$ |
| 5 | $20 \leq f(i,j) < 24$ | 30 | $120 \leq f(i,j) < 124$ | 55 | $220 \leq f(i,j) < 224$ |
| 6 | $24 \leq f(i,j) < 28$ | 31 | $124 \leq f(i,j) < 128$ | 56 | $224 \leq f(i,j) < 228$ |
| 7 | $28 \leq f(i,j) < 32$ | 32 | $128 \leq f(i,j) < 132$ | 57 | $228 \leq f(i,j) < 232$ |
| 8 | $32 \leq f(i,j) < 36$ | 33 | $132 \leq f(i,j) < 136$ | 58 | $232 \leq f(i,j) < 236$ |
| 9 | $36 \leq f(i,j) < 40$ | 34 | $136 \leq f(i,j) < 140$ | 59 | $236 \leq f(i,j) < 240$ |
| 10 | $40 \leq f(i,j) < 44$ | 35 | $140 \leq f(i,j) < 144$ | 60 | $240 \leq f(i,j) < 244$ |
| 11 | $44 \leq f(i,j) < 48$ | 36 | $144 \leq f(i,j) < 148$ | 61 | $244 \leq f(i,j) < 248$ |
| 12 | $48 \leq f(i,j) < 52$ | 37 | $148 \leq f(i,j) < 152$ | 62 | $248 \leq f(i,j) < 252$ |
| 13 | $52 \leq f(i,j) < 56$ | 38 | $152 \leq f(i,j) < 156$ | 63 | $252 \leq f(i,j) < 256$ |
| 14 | $56 \leq f(i,j) < 60$ | 39 | $156 \leq f(i,j) < 160$ | 64 | $256 \leq f(i,j)$ |
| 15 | $60 \leq f(i,j) < 64$ | 40 | $160 \leq f(i,j) < 164$ | | |
| 16 | $64 \leq f(i,j) < 68$ | 41 | $164 \leq f(i,j) < 168$ | | |
| 17 | $68 \leq f(i,j) < 72$ | 42 | $168 \leq f(i,j) < 172$ | | |
| 18 | $72 \leq f(i,j) < 76$ | 43 | $172 \leq f(i,j) < 176$ | | |
| 19 | $76 \leq f(i,j) < 80$ | 44 | $176 \leq f(i,j) < 180$ | | |
| 20 | $80 \leq f(i,j) < 84$ | 45 | $180 \leq f(i,j) < 184$ | | |
| 21 | $84 \leq f(i,j) < 88$ | 46 | $184 \leq f(i,j) < 188$ | | |
| 22 | $88 \leq f(i,j) < 92$ | 47 | $188 \leq f(i,j) < 192$ | | |
| 23 | $92 \leq f(i,j) < 96$ | 48 | $192 \leq f(i,j) < 196$ | | |
| 24 | $96 \leq f(i,j) < 100$ | 49 | $196 \leq f(i,j) < 200$ | | |

FIG. 10

| DATA LEVEL | THRESHOLD VALUE FOR EACH LEVEL | DATA LEVEL | THRESHOLD VALUE FOR EACH LEVEL | DATA LEVEL | THRESHOLD VALUE FOR EACH LEVEL |
|---|---|---|---|---|---|
| 0 | 0 | 25 | 100 | 50 | 200 |
| 1 | 4 | 26 | 104 | 51 | 204 |
| 2 | 8 | 27 | 108 | 52 | 208 |
| 3 | 12 | 28 | 112 | 53 | 212 |
| 4 | 16 | 29 | 116 | 54 | 216 |
| 5 | 20 | 30 | 120 | 55 | 220 |
| 6 | 24 | 31 | 124 | 56 | 224 |
| 7 | 28 | 32 | 128 | 57 | 228 |
| 8 | 32 | 33 | 132 | 58 | 232 |
| 9 | 36 | 34 | 136 | 59 | 236 |
| 10 | 40 | 35 | 140 | 60 | 240 |
| 11 | 44 | 36 | 144 | 61 | 244 |
| 12 | 48 | 37 | 148 | 62 | 248 |
| 13 | 52 | 38 | 152 | 63 | 252 |
| 14 | 56 | 39 | 156 | 64 | 256 |
| 15 | 60 | 40 | 160 | | |
| 16 | 64 | 41 | 164 | | |
| 17 | 68 | 42 | 168 | | |
| 18 | 72 | 43 | 172 | | |
| 19 | 76 | 44 | 176 | | |
| 20 | 80 | 45 | 180 | | |
| 21 | 84 | 46 | 184 | | |
| 22 | 88 | 47 | 188 | | |
| 23 | 92 | 48 | 192 | | |
| 24 | 96 | 49 | 196 | | |

IMAGE PROCESSING METHOD AND APPARATUS WITH STORING AND SELECTING OF DOT PATTERNS

BACKGROUND OF THE INVENTION

1. Field of the Invention

The invention relates to image processing method and apparatus for binarizing input multi-level image data into binary data.

2. Related Background Art

Hitherto, in an image processing apparatus of a digital copying apparatus, a digital facsimile, a printer, or the like, input multi-level image data is binarized into binary data.

Hitherto, in a case of converting multi-level data of a low pixel density into binary data of a high pixel density and when a importance is attached to a processing speed, a method of binarizing while executing a high pixel density realizing (enlarging) process, such as a density pattern method, is used. In a case of attaching an importance to a picture quality, a binarizing method whereby after multi-level data has been enlarged, binary data is also regarded as one pixel for one pixel of the multi-level data, such as an error diffusion method, is used.

As inventions regarding the error diffusion method, the same applicant as the present invention has filed U.S. Pat. Nos. 4,876,610, 4,878,125, 5,008,950, 4,958,236, 4,975, 786, 4,958,238, and 5,086,484.

However, according to the above conventional examples, when the multi-level data of a low pixel density is converted into the binary data of a high pixel density, in a case of binarizing by using the binarizing method like a density pattern method whereby a plurality of pixels of the binary data are allocated to one pixel of the multi-level data, the binarization can be performed at a high speed. However, errors which are generated upon binarization cannot be propagated and a limitation occurs in the gradation expression, so that there is also a problem in terms of the picture quality. On the other hand, in a case of performing the binarization by using a binarizing method like an error diffusion method whereby one pixel of the binary data is allocated to one pixel of the multi-level data and errors generated upon binarization are diffused, thereby obtaining an excellent gradation expression, the binarization can be performed with a high picture quality. However, since many processes such as an error diffusing process and the like which need a long time are executed, it takes a long time for binarization. In addition, since an enlarging process (resolution converting process) must be also performed, there is also a drawback such that it takes a long processing time.

In a case of performing the binarization by using the error diffusion method, since the positions at which the dots of Y, M, and C are printed are unstable, there is a drawback such that the dots of YMC to be printed inherently at the same position are not always printed to the same position, so that a binarizing method which is not suitable to the subtractive color mixture theory is executed and color reproducibility is deteriorated.

SUMMARY OF THE INVENTION

It is an object of the invention to eliminate the drawbacks of the conventional techniques mentioned above and to provide an image processing method and apparatus which can obtain an image of a high picture quality at a high speed by a simple construction.

Another object of the invention is to provide an image processing method and apparatus in which data is divided into several levels, dot patterns according to the levels are allocated, errors are calculated from the data level and a threshold value according to the data level, and the errors are diffused, so that a binarizing process of a high fineness can be performed at a high speed.

According to the present invention, the above objects are accomplished by an image processing apparatus comprising: input means for inputting multi-level data; arithmetic operating means for adding error data to the input multi-level data and calculating error correction data; selecting means for selecting a predetermined dot pattern on the basis of the error correction data; error calculating means for calculating a difference between a representative value for each dot pattern and the error correction data; and storing means for storing the difference as error data into a memory.

According to the invention, by constructing the selecting means and the error arithmetic operating means by a ROM, the high speed binarizing process can be realized by a simple circuit construction.

Still another object of the invention is to provide an image processing method and apparatus in which simultaneously with the binarizing process, data which is input at a low density (for example, 100 dpi) can be converted into data of a high density (for instance, 400 dpi) in both of the main and sub scan directions, and an image of a high picture quality can be obtained.

Another further object of the invention is to provide an image processing method and apparatus in which even in a case of different input pixel densities, by providing a plurality of kinds of density patterns according to a plurality of input resolutions, output pixel densities of input data of various kinds of image densities can be equalized.

According to the invention, the above objects are accomplished by an image processing apparatus comprising: input means for inputting multi-level data; arithmetic operating means for adding error data to the input multi-level data and calculating error correction data; selecting means for selecting a predetermined dot pattern in accordance with the error correction data and a pixel density of the input multi-level data; error calculating means for calculating a difference between a representative value for each dot pattern and the error correction data; and storing means for storing the difference as error data into a memory.

Another further object of the invention is to provide an image processing method and apparatus in which in the case where a pixel density of output data can be selected and output, density patterns of a plurality of sizes are selected on the basis of the selected pixel density and the input data is converted, so that the conversion into the selected output pixel density can be executed at a high speed and errors of the input/output data are also corrected, and an image of a high picture quality can be obtained.

According to the invention, the above object is accomplished by an image processing apparatus comprising: input means for inputting multi-level data; arithmetic operating means for adding error data to the input multi-level data and calculating error correction data; selecting means for selecting a predetermined dot pattern in accordance with the error correction data and a pixel density of an output apparatus; error calculating means for calculating a difference between a representative value for each dot pattern and the error correction data; and storing means for storing the difference as error data into a memory.

Another further object of the invention is to provide an image processing method and apparatus in which by setting the same density pattern to input data of a plurality of colors, a color reproducing region by a subtractive color mixture can be almost covered and a color image of an excellent color reproducibility and a high picture quality can be obtained at a high speed.

According to the invention, the above object is accomplished by an image processing apparatus comprising: input means for inputting multi-level data of a plurality of colors; and a plurality of converting means for converting the multi-level data of the plurality of colors into the binary data every color, wherein each of the plurality of converting means has arithmetic operating means for adding error data to the input multi-level data and calculating error correction data, selecting means for selecting a predetermined dot pattern on the basis of the error correction data, error calculating means for calculating a difference between a representative value for each dot pattern and the error correction data, and storing means for storing the difference as error data into a memory, wherein the dot patterns which are used when the multi-level data of a plurality of colors are converted into the binary data are equalized.

Another further object of the invention is to provide an image processing method and apparatus in which even when input data has the same density, by changing a density pattern which is used every scan, the generation of a stripe line at a turning point of the scan can be prevented.

The above and other objects and features of the present invention will become apparent from the following detailed description and the appended claims with reference to the accompanying drawings.

BRIEF DESCRIPTION OF THE DRAWINGS

FIG. 2 is a diagram showing data levels for density data after completion of the error correction;

FIGS. 3 and 6 to 8 are diagrams showing examples of density patterns;

FIG. 4 is a diagram showing threshold values for each level showing output densities of data levels;

FIG. 9 is a diagram showing data levels for density data after completion of the error correction;

FIG. 10 is a diagram showing threshold values for each level for data levels;

DETAILED DESCRIPTION OF THE PREFERRED EMBODIMENTS

[First embodiment]

An embodiment of the invention will be described in detail hereinbelow with reference to the drawings.

Figure 1:
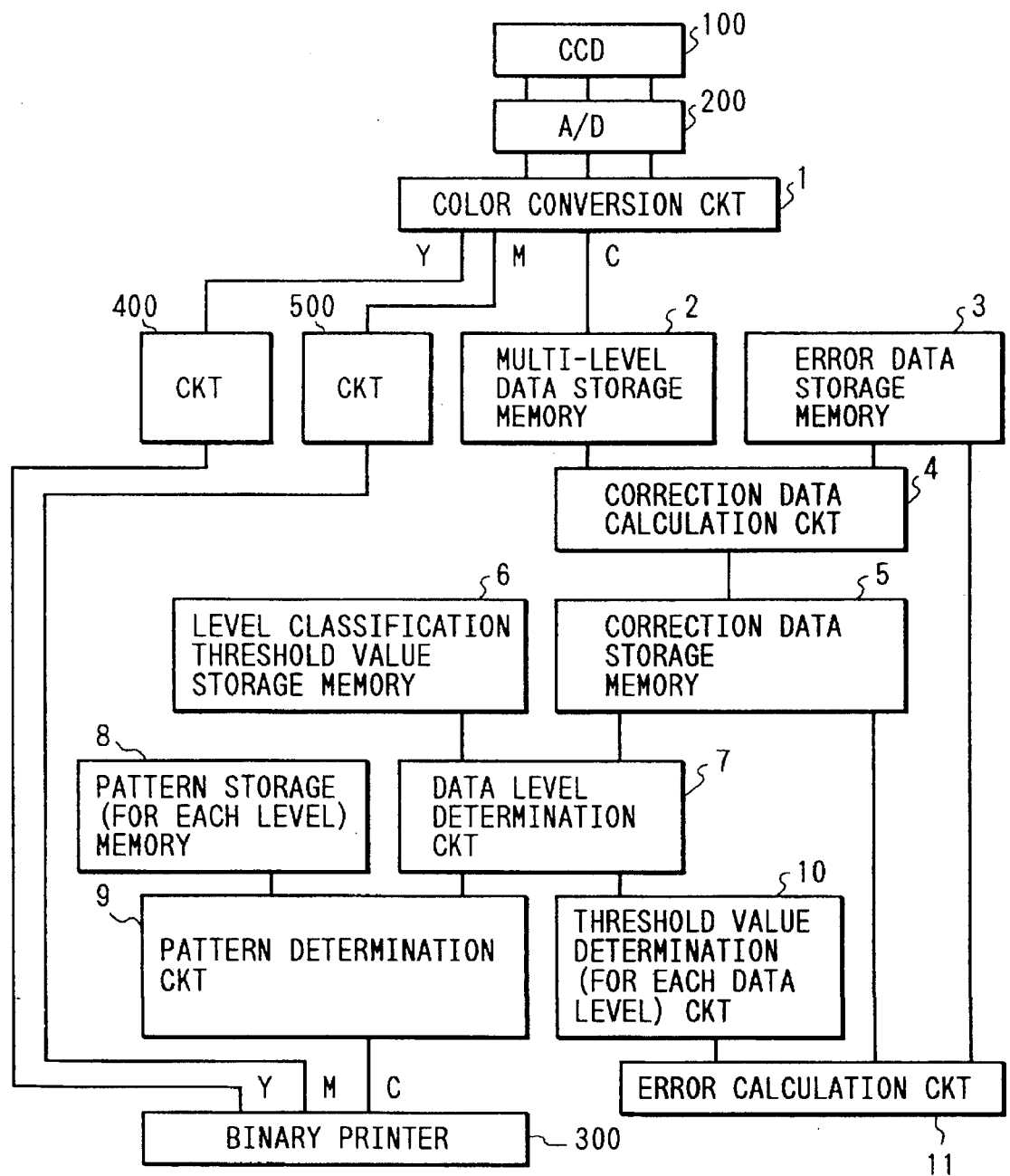
FIG. 1 is a block diagram showing a construction of an image processing apparatus in the first embodiment of the invention.

FIG. 1 is a block diagram showing a construction of an image processing apparatus in the embodiment of the invention.

In FIG. 1, reference numeral 100 denotes a CCD for reading an image of an original and generating analog data of each color of R, G, and B; 200 an A/D converter for converting the analog data sent from the CCD 100 into the digital data of one pixel and eight bits of each color of R, G, and B; and 1 a color conversion circuit for converting the R, G, and B data into the data of one pixel and eight bits of each color of Y, M, and C by the masking process. In the case where the output apparatus is of the RGB system, the above converting process is unnecessary. A necessary image process such as a γ (gamma) conversion or the like is also executed in the color conversion circuit 1. In the above description, the data has been input through the CCD 100 and the A/D converter 200. However, the embodiment can be also applied to a construction in which data is input from a host computer. When the Y, M, and C data which is used by a printer is sent from the host computer, the processes in the color conversion circuit 1 as mentioned above can be omitted.

The Y, M, and C data from the color conversion circuit 1 is binarized into the binary data for every color. However, since component elements 2 to 11 of the circuit for the binarizing process which is used for each color are substantially equal, explanation will now be made hereinbelow with respect to the circuit of C. Reference numerals 400 and 500 denote circuits including the circuit of the component elements 2 to 11, respectively.

Reference numeral 2 denotes a multi-level data storage memory to store the color converted multi-level data; 3 an error data storage memory to store errors which are generated when binarizing the multi-level data by using the present apparatus; 4 a correction data calculation circuit for calculating multi-level data after completion of the error correction by adding the multi-level data stored in the multi-level data storage memory 2 and the error data stored in the error data storage memory 3; 5 a correction data storage memory for storing the error corrected data which was calculated by the correction data calculation circuit 4; 6 a level classification threshold value storage memory in which there are threshold values to classify the corrected data into the levels. FIG. 2 shows the details of the level classification threshold value storing circuit. Reference numeral 7 denotes a data level determination circuit for deciding the level of the corrected data by comparing the error corrected data stored in the correction data storage memory 5 and the threshold value stored in the level classification threshold value storage memory 6. Reference numeral 8 denotes a pattern storage (for each level) memory for storing the dot pattern for each level. FIG. 3 shows patterns stored in the pattern storage (for each level) memory 8. Reference numeral 9 denotes a pattern determination circuit for deciding the dot pattern stored in the pattern storage memory 8 in accordance with the level of the error corrected data which was decided by the data level determination circuit 7. The data from the pattern determination circuit 9 is sent to a binary printer 300. Reference numeral 10 denotes a threshold value determination (for each data level) circuit for deciding the threshold value in accordance with the level of the error corrected data which was decided by the data level determination circuit 7. FIG. 4 shows the threshold values for every data level. The threshold value corresponds to the output density of the dot pattern. Reference numeral 11 denotes an error calculation circuit for calculating errors which are generated upon binarization by subtracting the threshold value for each data level which was decided by the threshold value determination (for each data level) circuit 10 from the error corrected data which was stored in the correction data storage memory. The errors are stored into the error data storage memory 3. As for the error data stored in the error data storage memory 3, a predetermined weight is added to a plurality of input multi-level data which is not yet binarized. The weighted data is diffused.

Processes of the circuit in FIG. 1 will now be described hereinbelow.

The image data sent from the color conversion circuit is stored into the multi-level data storage memory 2. The data read out from the multi-level data storage memory 2 is added to the error data from the error data storage memory 3 by the correction data calculation circuit 4. The error data which is added here is generated from the pixels which have already been binarized. The error corrected data is once stored into the correction data storage memory 5 and is sent to the data level determination circuit 7. The data level is determined in dependence on to which level of f(i, j) shown in FIG. 2 the level of the data after completion of the error correction belongs.

The pattern determination circuit 9 selects one of the plurality of patterns shown in FIG. 3 in accordance with the decided data level and sends the binary dot pattern to the binary printer 300. The binary printer 300 on/off controls the dots in accordance with the dot pattern sent and forms an image.

The level decided by the data level determination circuit 7 is also sent to the threshold value determination (for each data level) circuit 10. The threshold value for each level shown in FIG. 4 is obtained in accordance with the data level and sent to the error calculation circuit 11. The error calculation circuit 11 calculates an error between the data from the correction data storage memory 5 and the threshold value for each level and stores the error value into the error data storage memory 3.

When the value of "150" is sent as error corrected data from the correction data storage memory 5 to the data level determination circuit 7, the data level determination circuit 7 selects "9" as a data level. The pattern determination circuit 9 selects the dot pattern of the level 9 in FIG. 3.

The threshold value determination (for each data level) circuit 10 sends the threshold value "144" for each level to the error calculation circuit 11. The error calculation circuit 11 stores a difference "−6" between "150" and "144" into the error data storage memory 3.

According to the embodiment as described above, the data is divided into several levels, the dot patterns according to the levels are allocated, the errors are calculated from the data level and the threshold value corresponding to the data level, and the errors are diffused, so that a high speed and high fine binarizing process can be executed.

According to the embodiment, simultaneously with the binarizing process, the data which was input at a low density (for example, 100 dpi) can be converted into the data of a high density (400 dpi) in both of the main and sub scan directions. An image of a high picture quality can be obtained.

Further, in the embodiment, the level classification threshold value storage memory 6, data level determination circuit 7, threshold value determination (for each data level) circuit 10, and error calculation circuit 11 are constructed by an ROM. The data from the correction data storage memory 5 is set to address data and the data level value, threshold value for each data level, and error data are generated.

Consequently, the high speed binarizing process can be realized by a simple circuit construction.

In the above embodiment, the binary data of (4×4) pixels has been formed for the multi-level data for one pixel. However, it is also possible to form data so long as it consists of (n×m) (n, m: integers of 2 or more) pixels. In this instance, the number of patterns is equal to (n×m+1). When n=m, the binarization can be performed while enlarging the original data by integer times. When n≠m, the binarization can be executed while increasing the original data n times in the vertical direction and m times in the lateral direction.

The invention is not limited to the foregoing embodiment but the invention can be also accomplished in an apparatus or a system comprising a plurality of apparatuses. The invention can be also obviously applied to the case of accomplishing the invention by supplying a program to an apparatus or a system.

[Second embodiment]

An example of selecting one of a plurality of binarizing methods in accordance with the pixel density of input data will now be described with reference to FIG. 5.

Figure 5:
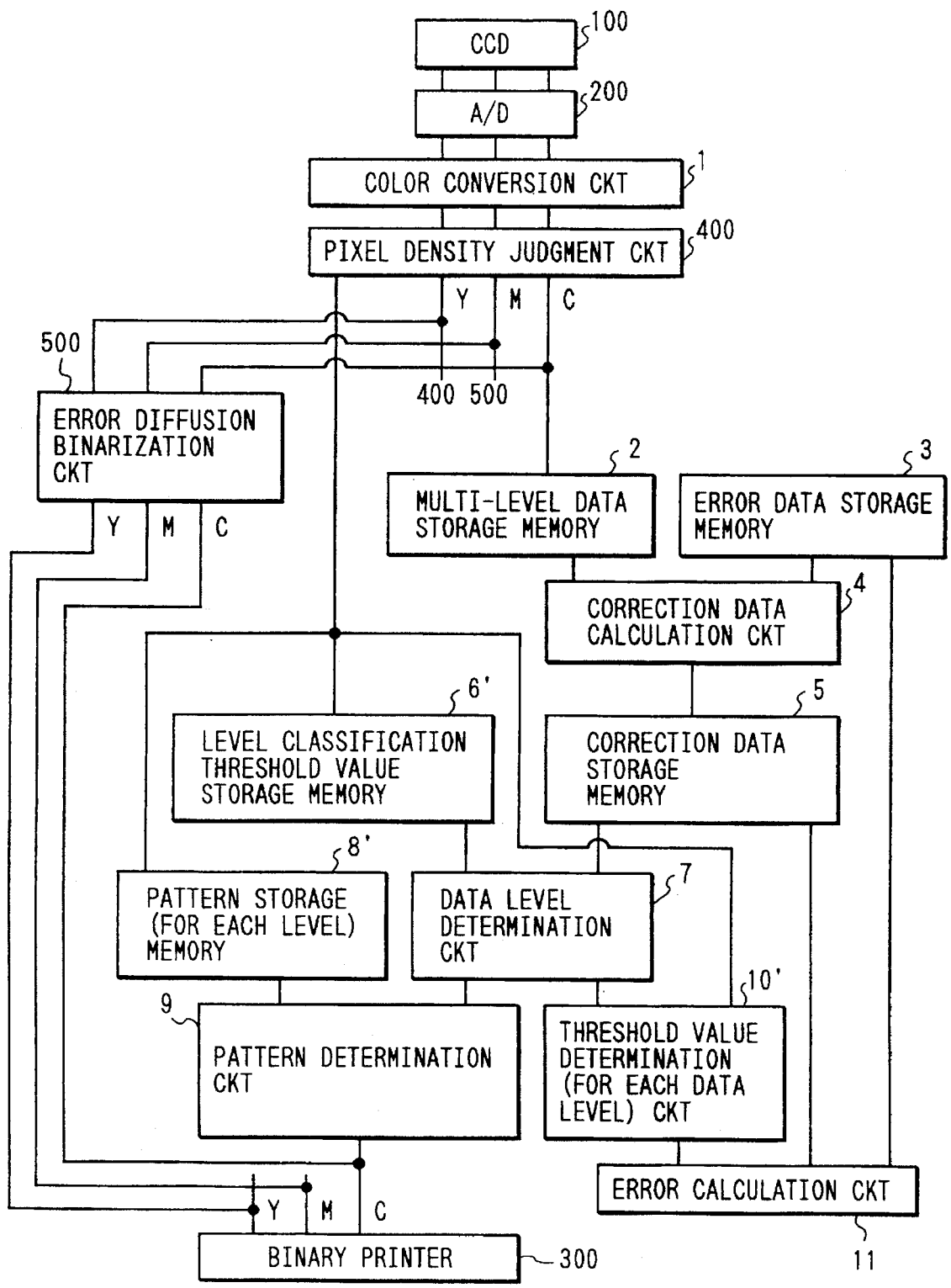
FIG. 5 is a block diagram showing a construction of an image processing apparatus in the second embodiment of the invention.

In FIG. 5, the same portions as those shown in FIG. 5 are designated by the same reference numerals and their detailed descriptions are omitted here.

In FIG. 5, explanation will now be made with respect to the case where the recording density of the binary printer 300 is set to 400 dpi and there are pixel densities such as 100 dpi, 400 dpi, and 50 dpi as pixel densities of the input data.

The pixel density judgment circuit 400 judges the pixel density of the input data by measuring a period of a data transfer clock from the color conversion circuit 1. The pixel density of the input data can be also judged by discriminating a reading resolution of the original image which was set by the operator.

In case of inputting the data sent from an external apparatus such as a host computer or the like, the pixel density is judged on the basis of command data from the external apparatus.

Figure 7:
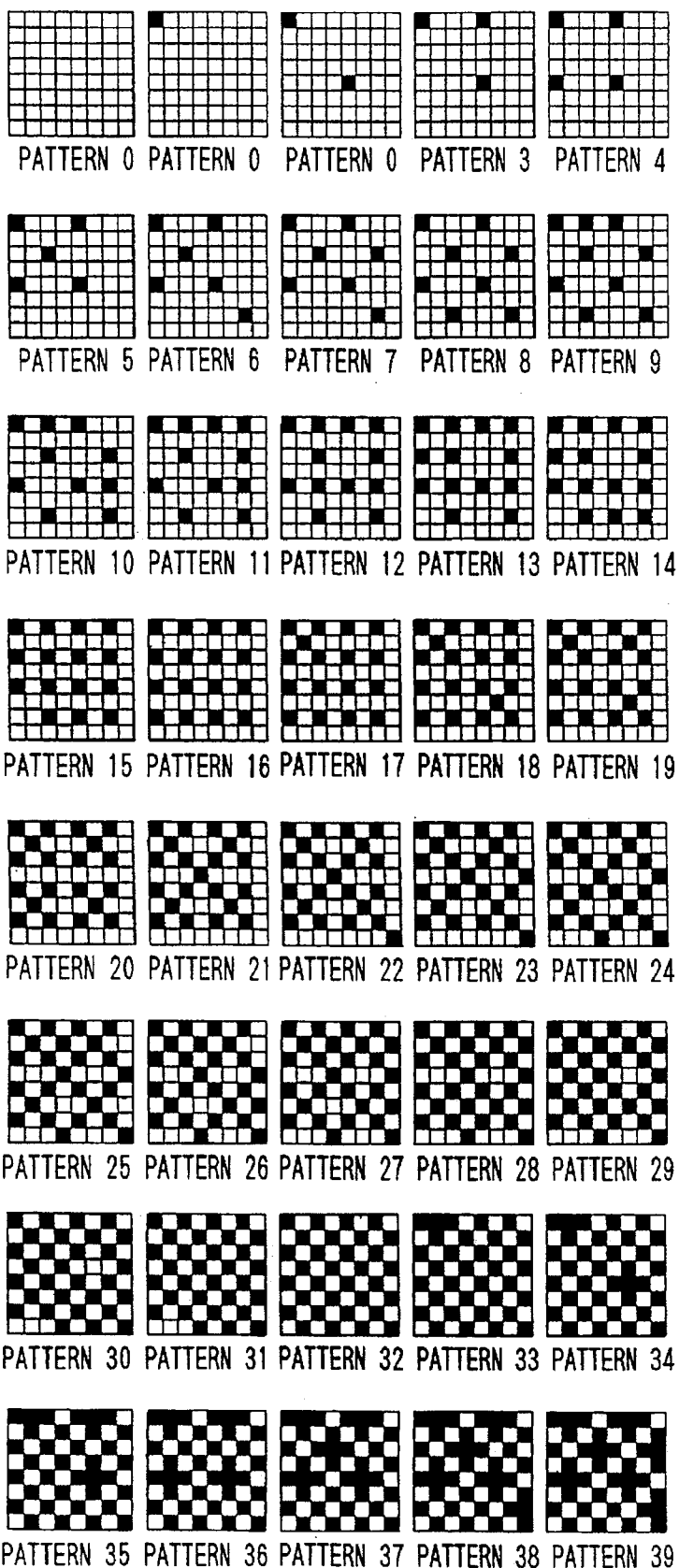

Density patterns for input data of 100 dpi as shown in FIG. 6 and density patterns for input data of 50 dpi shown in FIGS. 7 and 8 have been stored in a pattern storage (for each level) memory 8'.

In accordance with a discrimination signal from the pixel density judgment circuit 400, when the resolution of the input data is equal to 100 dpi, the density patterns of FIG. 6 are selected and, when the resolution of the input data is equal to 50 dpi, the density patterns of FIGS. 7 and 8 are selected. Since the dot patterns which are used in the embodiment are the patterns in which the dots are relatively distributed instead of the patterns of the dot concentrated type, the generation of a stripe line in a uniform density portion can be prevented.

In addition to the data for input data of 100 dpi shown in FIG. 2, the data for input data of 50 dpi shown in FIG. 9 has been also stored in a level classification threshold value storage (for each level) memory 6'. Either one of the data for input data of 100 dpi and the data for input data of 50 dpi is selected in accordance with the data from the judgment circuit 400.

Similarly, in addition to the data for input data of 100 dpi in FIG. 4, the data for input data of 50 dpi shown in FIG. 10 has also been stored in a threshold value determination (for each data level) circuit 10'. Either one of the data for input data of 100 dpi and the data for input data of 50 dpi is selected in accordance with the data from the judgment circuit 400.

Even in the case where the resolution of the input data is equal to either one of 100 dpi and 50 dpi in the above construction, the output binary data can be generated as data of 400 dpi.

In the case where the resolution of input data is equal to 400 dpi, the pixel density judgment circuit 400 sends the data to the error diffusion binarization circuit 500 and also sends a symbol (signal) to make the data effective to the error diffusion binarization circuit 500. When the resolution of the input data is equal to 100 dpi or 50 dpi, data to make the signal to the binarization circuit 500 invalid is sent.

The error diffusion binarization circuit 500 compares the data of 400 dpi with a predetermined threshold value (127) for every pixel for each color and generates binary data. Further, the circuit 500 sequentially executes the binarizing process while correcting errors between the input data and the output data which are generated at the time of the binarization. The binarization result is sent as data of 400 dpi to the binary printer 300.

According to the second embodiment of the invention as mentioned above, even in the case where the pixel densities of the input data differ, the output pixel density can be equalized and an image of a high picture quality can be obtained.

By providing a plurality of density patterns according to a plurality of input resolutions, output pixel densities of the input data of various kinds of image densities can be equalized.

[Third embodiment]

Figure 11:
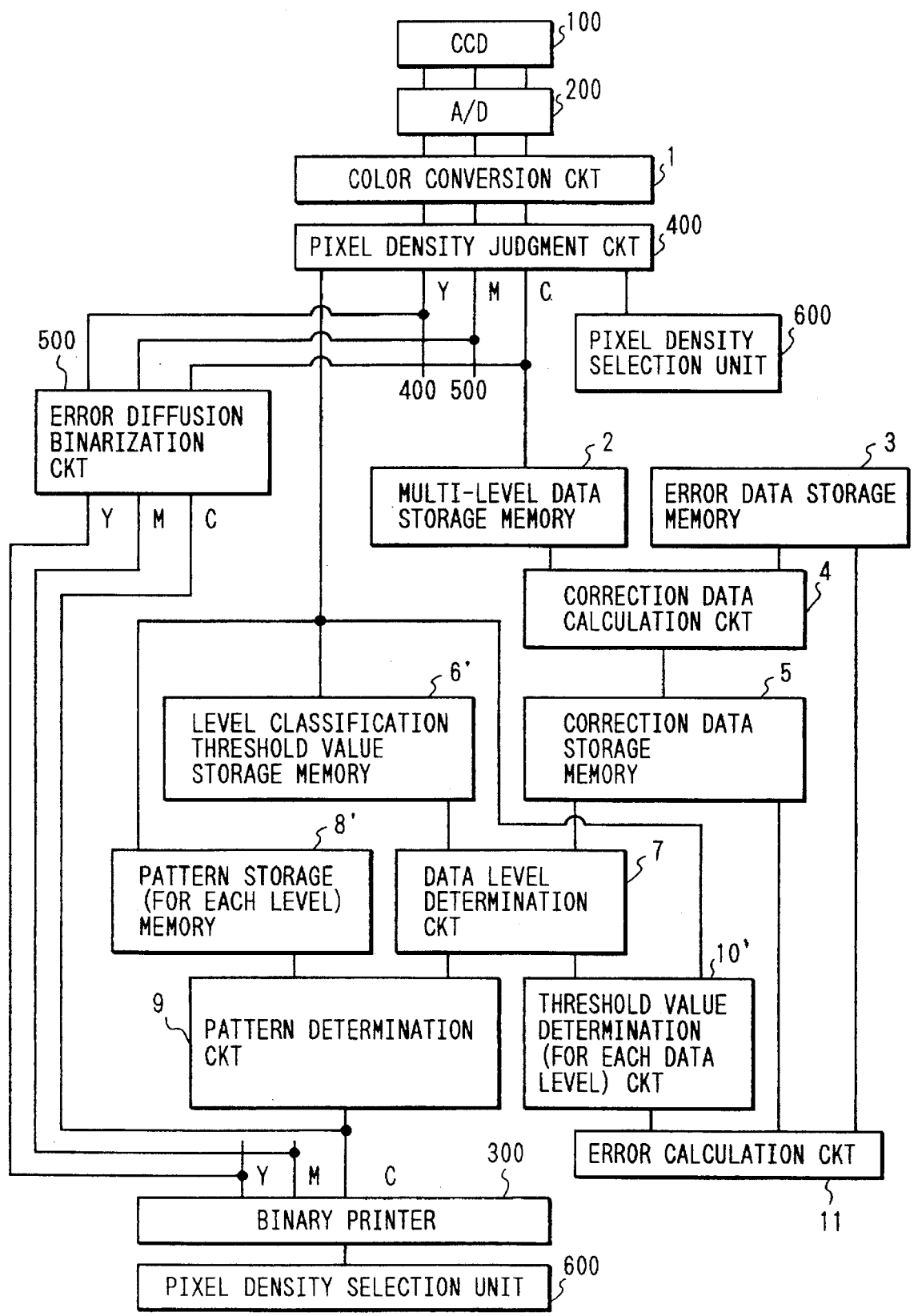
FIG. 11 is a block diagram showing a construction of an image processing apparatus in the third embodiment of the invention.

FIG. 11 is a block diagram showing a construction of the third embodiment. In FIG. 11, the same portions as shown in FIG. 5 are designated by the same reference numerals and their detailed descriptions are omitted here.

FIG. 11 shows a construction in which a pixel density selection unit 600 which can select either one of 100 dpi, 400 dpi, and 800 dpi as an output pixel density of the binary printer 300. Although the pixel density of the input data is fixed to 100 dpi, the data of 100 dpi can be converted into the data of 400 dpi or 800 dpi and can be generated while the data of 100 dpi is maintained as data of 100 dpi.

Namely, when the pixel density selection unit 600 selects 100 dpi as a pixel density of the binary printer 300, the input data of 100 dpi is converted into the binary data of 100 dpi by the error diffusion binarization circuit 500 and is sent to the binary printer 300.

When the output pixel density of 400 dpi is selected, the input data of 100 dpi is converted into the binary data of 400 dpi on the basis of the tables in FIGS. 2 and 4 and the density patterns shown in FIG. 6 and is sent to the binary printer 300.

When the output pixel density of 800 dpi is selected, the input data of 100 dpi is converted into the binary data of 800 dpi on the basis of the tables in FIGS. 9 and 10 and the density patterns shown in FIGS. 7 and 8 and is sent to the binary printer 300.

According to the third embodiment of the invention as mentioned above, when the pixel density of the output data can be selected and output, the density patterns of a plurality of sizes are selected on the basis of the result of the selection and the input data is converted. Therefore, the conversion into the selected output pixel density can be executed at a high speed and the errors of the input/output data are also corrected, so that an image of a high picture quality can be obtained.

In the second and third embodiments as well, in a manner similar to the first embodiment, the invention can be also accomplished in an apparatus or a system comprising a plurality of apparatuses. It will be also obviously understood that the invention can be applied to the case of accomplishing the invention by supplying a program to the apparatus or the system.

In the above first to third embodiments, the density pattern has been determined by the table conversion constructed by the ROM, it can be also obtained by an arithmetic operation.

An embodiment in such a case will now be described with reference to FIG. 12.

In the diagram, reference numeral 21 denotes a multi-level data storage memory to store multi-level image data on the basis of processes to execute the binarizing process. It is now assumed here that, for example, 100 (256 gradations) is stored. Reference numeral 22 denotes an error data storage memory to store error data which is generated when the multi-level data is binarized by the present apparatus. Binarization errors which are generated in case of binarizing the pixel which is one preceding to the pixel (target pixel) to be binarized at present are stored into the error data storage memory 22. For example, it is assumed that four (256 gradations) is stored. Reference numeral 23 denotes a gradation change circuit for obtaining multi-level image data of a gradation lower than the gradation of the multi-level image data from the data that is obtained by adding the multi-level image data stored in the multi-level data storage memory 21 and the error data stored in the error data storage memory 22 and, further, for calculating errors. For example, the quotient=6 which is obtained by dividing the value=104 derived by adding the target pixel=100 of 256 gradations and the error data=4 in order to obtain 16 gradations is set to the converted gradation. The remainder=8 at that time is calculated as an error. The error data calculated by the gradation change circuit is stored into the error data storage memory 22. Reference numeral 24 denotes a dot pattern storage memory to store dot patterns of the new gradation number of the multi-level data changed by the gradation change circuit. The dot patterns as shown in FIGS. 3 and 6 are stored here.

As a dot pattern which is used in the invention, it is confirmed that a pattern in which the dots are not neighboring is used, for example, in case of a pattern which is constructed by 16 dots as a whole and in which eight bits are fully painted, a pattern other than a pattern such that all of eight bits are neighboring is used.

Reference numeral 25 denotes a pattern determination circuit for performing the binarization by allocating the dot patterns stored in the dot pattern storage memory 24 in accordance with the gradation of the data changed by the gradation change circuit 23. For example, in this instance, since the gradation of the multi-level data has been changed to "6" by the gradation change circuit 23, by allocating the pattern "6", the binarization is executed. By performing the above processes with respect to all of the multi-level image data, the binarizing process can be executed.

Figure 12:
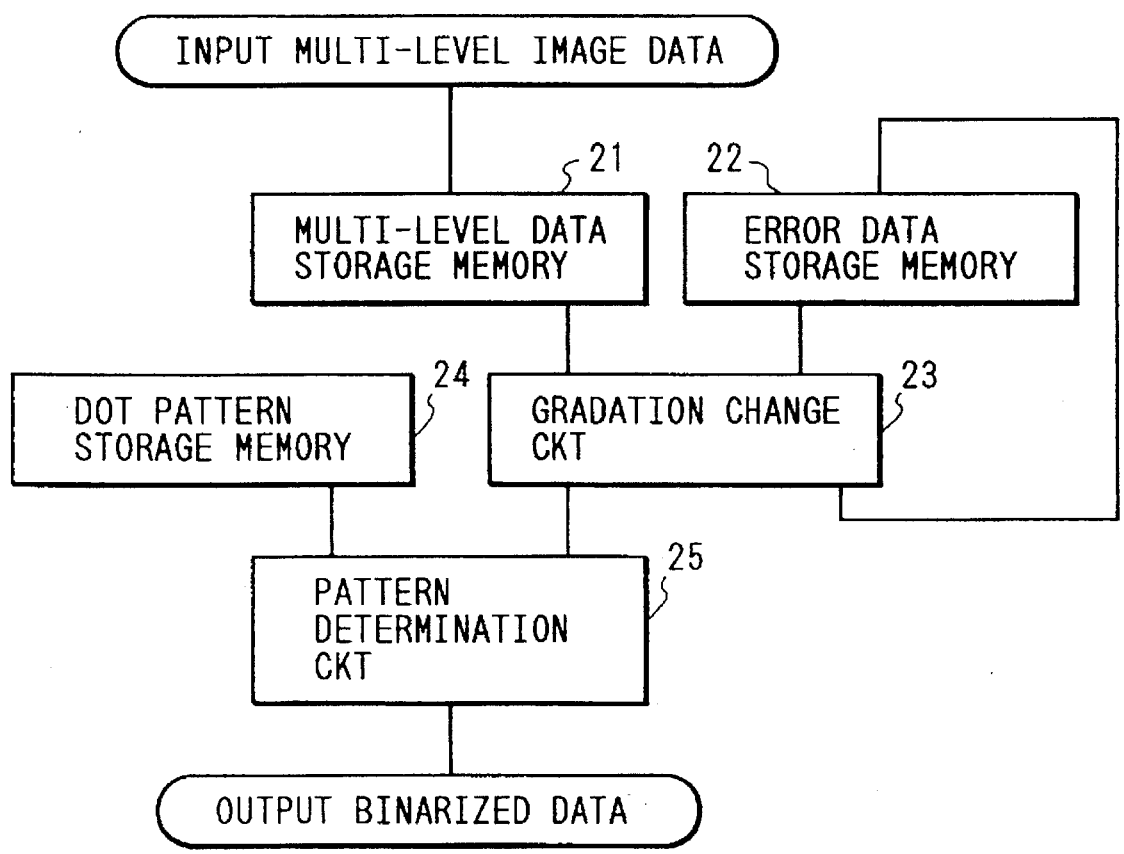
FIGS. 12 and 13 are diagrams showing other circuits for deciding a density pattern.
Figure 13:
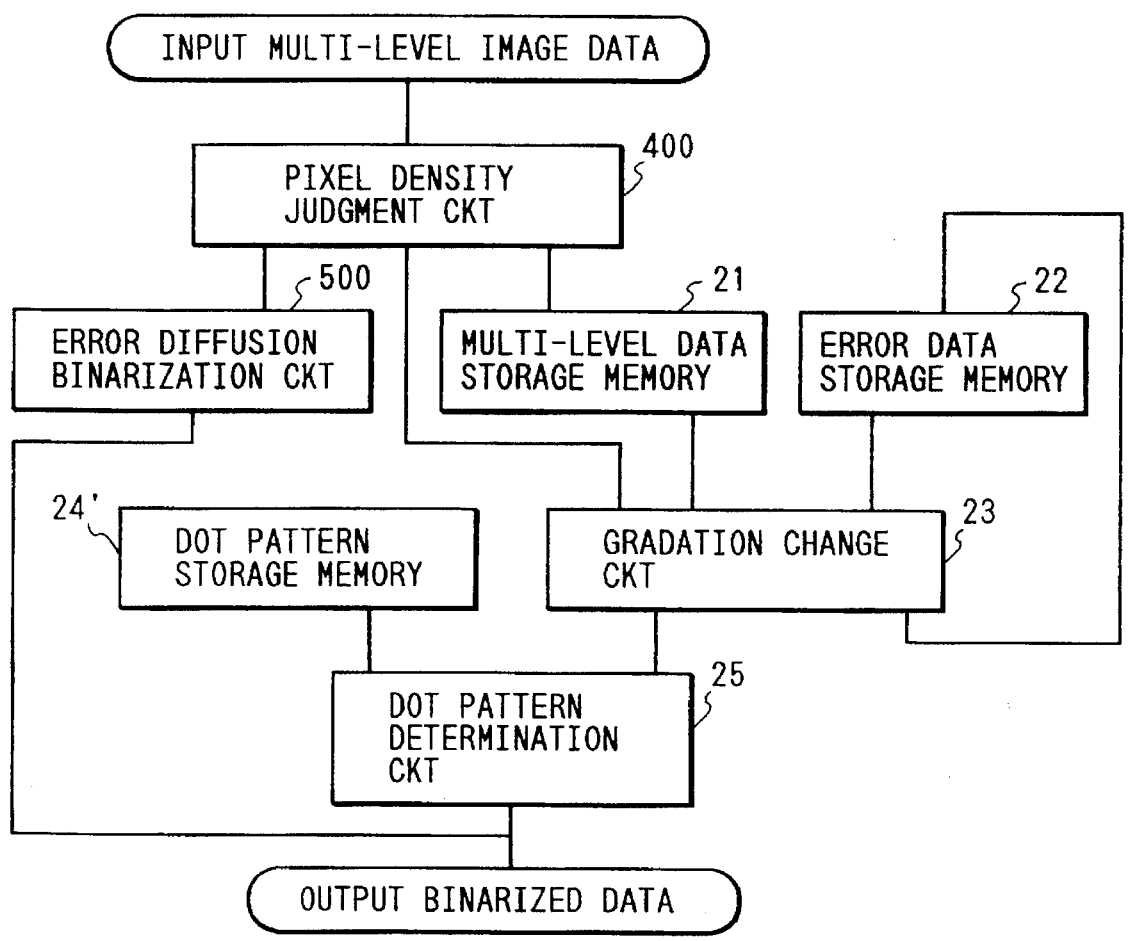

According to the construction shown in FIG. 12 as mentioned above, since the output density pattern is determined by the arithmetic operation without using any table, by storing the density patterns of a plurality of sizes, a plurality of pixel densities can be easily converted. FIG. 13 shows a circuit construction in this case. That is, the gradation change circuit 23 calculates the data to select the density pattern and the error data in accordance with the pixel density from the pixel density judgment circuit.

In the circuit construction shown in FIG. 1, by equalizing the density patterns which are used in the circuits of Y, M, and C, an image having an excellent color reproducibility can be obtained. Either one of the patterns shown in FIGS. 3 and 6 is used as a pattern to be used.

By binarizing the data of Y, M, and C by using the same density pattern as mentioned above, the dots of Y, M, and C can be printed at the same position.

Figure 14:
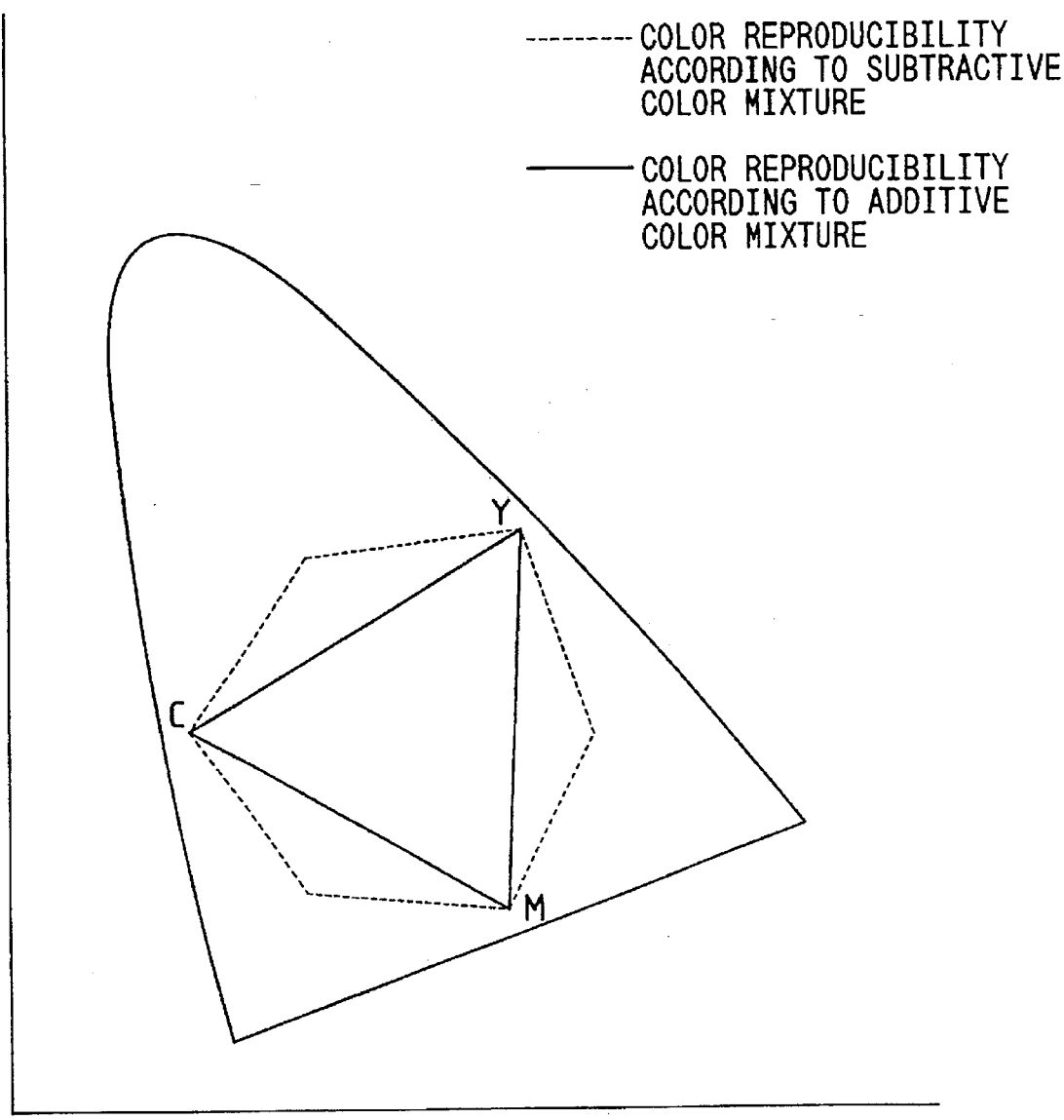
FIG. 14 is a diagram showing a color reproducibility.

FIG. 14 shows color reproducing regions in the case where three colors of Y, M, and C are subjected to an additive color mixture process and the case where they are subjected to a subtractive color mixture process.

In case of performing the binarization by using the error diffusion method (particularly, in the low density portion), the additive color mixture is mixedly performed in accordance with the position of the dots of Y, M, and C to be printed, so that there is a drawback such that an unstable color reproducing region appears. However, by setting the density patterns of Y, M, and C data into the same density pattern as in the invention, a color image of a high picture quality having an excellent color reproducibility which can almost cover the color reproducing region by the subtractive color mixture can be obtained at a high speed.

In the first to third embodiments, in the case where the binary printer 300 is a printer of the raster scan type such as an ink jet printer or the like in which data of one or a few lines is recorded and, after that, a recording paper and a recording head are relatively moved and the data of the next one or a few lines is recorded, there is a fear such that a stripe line is generated at the turning point of the scan.

Therefore, by changing the processing method in the first to third embodiments and, even in the case where the densities of the input data are equal, by changing the density patterns which are used every scan, the generation of a stripe line at the turning point of the scan can be prevented. That is, in the odd-number designated scan, the density patterns shown in FIG. 3 are used and, in the even-number designated scan, the density patterns shown in FIG. 6 are used. Consequently, the regularity can be made disordered and the generation of a stripe line can be prevented.

Although the present invention has been described above with respect to the preferred embodiments, the invention is not limited to the above embodiments but many modifications and variations are possible within the spirit and scope of the appended claims of the invention.

What is claimed is:

1. An image processing apparatus comprising:
   input means for inputting multi-level data;
   arithmetic operating means for adding error data to the input multi-level data and calculating error corrected data;
   data level determination means for determining to which of a plurality of predetermined data levels the error corrected data corresponds;
   dot pattern storage means for previously storing, in correspondence with each of the plurality of predetermined data levels, a dot pattern which represents at which pixel position a dot is caused to appear, the pixel position being within a predetermined area consisting of a plurality of two-dimensional pixels;
   selecting means for selecting a pattern consisting of a plurality of pixels, the pattern having been stored in said dot pattern storage means, in accordance with the data level determined by said data level determination means;
   error calculating means for calculating a difference between a representative value for each dot pattern and the error corrected data; and
   storing means for storing the difference as error data into a memory.

2. An apparatus according to claim 1, wherein said data level determination means comprises a level classification threshold value storage memory in which threshold values to classify the error corrected data into data levels have been stored, and wherein said data level determination means classifies the error corrected data into data levels on the basis of the value of the error corrected data and the value stored in said level classification threshold value storage memory.

3. An apparatus according to claim 2, wherein said error calculating means comprises:
   a representative value storage memory in which representative values for each dot pattern have been stored; and
   an error calculating circuit for calculating error data on the basis of a value of the error corrected data and a value stored in said representative value storage memory.

4. An apparatus according to claim 3, wherein said level classification threshold value storage memory, said data level determination means, said representative value storage memory, and said error calculating circuit are constructed by a ROM.

5. An image processing apparatus comprising:
   input means for inputting multi-level data;
   arithmetic operating means for adding error data to the input multi-level data and calculating error corrected data;
   data level determination means for determining to which of a plurality of predetermined data levels the error corrected data corresponds;
   dot pattern storage means for previously storing, in correspondence with each of the plurality of predetermined data levels, a dot pattern which represents at which pixel position a dot is caused to appear, the pixel position being within a predetermined area consisting of a plurality of two-dimensional pixels, said dot pattern storage means storing a plurality of dot patterns each having a different size according to each of the plurality of predetermined data levels;
   judging means for judging a pixel density of the input multi-level data;
   selecting means for selecting a pattern consisting of a plurality of pixels, the pattern having been stored in said dot pattern storage means, in accordance with the data level determined by said data level determination means and the pixel density judged by said judging means;
   error calculating means for calculating a difference between a predetermined value for each dot pattern and the error corrected data; and
   storing means for storing the difference as error data into a memory.

6. An apparatus according to claim 5, further comprising binarizing means for binarizing the input multi-level data one pixel by one by an error diffusion method.

7. An apparatus according to claim 5, wherein said selecting means selects the dot pattern in accordance with the pixel density judged by said judging means so as to equalize pixel densities of dot patterns to be generated.

8. An image processing apparatus comprising:
   input means for inputting multi-level data;
   arithmetic operating means for adding error data to the input multi-level data and calculating error corrected data;
   data level determination means for determining to which of a plurality of predetermined data levels the error corrected data belongs;
   dot pattern storage means for previously storing, in correspondence with each of the plurality of predetermined data levels, a dot pattern which represents at which pixel position a dot is caused to appear, the pixel position being within a predetermined area consisting of a plurality of two-dimensional pixels, said dot pattern storage means storing a plurality of dot patterns each having a different size according to each of the plurality of predetermined data levels;

pixel density designating means for designating a pixel density of an output apparatus;

selecting means for selecting a pattern consisting of a plurality of pixels, the pattern having been stored in said dot pattern storage means, in accordance with the data level determined by said data level determination means and the pixel density designated by said pixel density designating means;

error calculating means for calculating a difference between a predetermined value for each dot pattern and the error corrected data; and storing means for storing the difference as error data into a memory.

9. An apparatus according to claim 8, further comprising binarizing means for binarizing the input multi-level data one pixel by one by an error diffusion method.

10. An apparatus according to claim 8, wherein said selecting means selects the dot pattern in accordance with the designated pixel density of the output apparatus so as to generate the dot pattern at the designated pixel density.

11. An image processing apparatus comprising:

input means for inputting multi-level data of a plurality of colors; and a plurality of converting means for converting the multi-level data of the plurality of colors into binary data for every color, wherein each of said plurality of converting means comprises (i) arithmetic operating means for adding error data to the input multi-level data and calculating error corrected data, (ii) data level determination means for determining to which of a plurality of predetermined data levels the error corrected data belongs, (iii) dot pattern storage means for previously storing in correspondence with each of the plurality of predetermined data levels, a dot pattern which represents at which pixel position a dot is caused to appear, the pixel position being within a predetermined area consisting of a plurality of two-dimensional pixels, (iv) selecting means for selecting a pattern consisting of a plurality of pixels, the pattern having been stored in said dot pattern storage means, in accordance with the data level determined by said data level determination means, (v) error calculating means for calculating a difference between a representative value for each dot pattern and the error corrected data, and (vi) storing means for storing the difference as error data into a memory, wherein dot patterns which are used when converting the multi-level data of the plurality of colors into the binary data are equalized.

12. An image processing method comprising:

an input step of inputting multi-level data;

an arithmetic operating step of adding error data to the input multi-level data and calculating error corrected data;

a data level determination step of determining to which of a plurality of predetermined data levels the error corrected data belongs;

a dot pattern storage step of previously storing, in correspondence with each of the plurality of predetermined data levels, a dot pattern which represents at which pixel position a dot is caused to appear, the pixel position being within a predetermined area consisting of a plurality of two-dimensional pixels;

a selecting step of selecting a pattern consisting of a plurality of pixels, the pattern having been stored in said dot pattern storage step, in accordance with the data level determined in said data level determination step;

an error calculating step of calculating a difference between a representative value for each dot pattern and the error corrected data; and a storing step of storing the difference as error data into a memory.

13. An image processing method comprising:

an input step of inputting multi-level data;

an arithmetic operating step of adding error data to the input multi-level data and calculating error corrected data;

a data level determination step of determining to which of a plurality of predetermined data levels the error corrected data belongs;

a dot pattern storage step of previously storing, in correspondence with each of the plurality of predetermined data levels, a dot pattern which represents at which pixel position a dot is caused to appear, the pixel position being within a predetermined area consisting of a plurality of two-dimensional pixels, said dot pattern storage step storing a plurality of dot patterns each having a different size according to each of the plurality of predetermined data levels;

a judging step of judging a pixel density of the input multi-level data;

a selecting step of selecting a pattern consisting of a plurality of pixels, the pattern having been stored in said dot pattern storage step, in accordance with the data level determined in said data level determination step and the pixel density judged in said judging step;

an error calculating step of calculating a difference between a representative value for each dot pattern and the error corrected data; and a storing step of storing the difference as error data into a memory.

14. A method according to claim 13, further comprising a binarizing step of binarizing the input multi-level data one pixel by one by an error diffusion method.

15. A method according to claim 13, wherein in said selecting step, a dot pattern is selected in accordance with the pixel density judged by said judging step so as to equalize the pixel densities of the dot patterns to be output.

16. An image processing method comprising:

an input step of inputting multi-level data;

an arithmetic operating step of adding error data to the input multi-level data and calculating error corrected data;

a data level determination step of determining to which of a plurality of predetermined data levels the error corrected data belongs;

a dot pattern storage step of previously storing, in correspondence with each of the plurality of predetermined data levels, a dot pattern which represents at which pixel position a dot is caused to appear, the pixel position being within a predetermined area consisting of a plurality of two-dimensional pixels, said dot pattern storage step storing a plurality of dot patterns each having a different size according to each of the plurality of predetermined data levels;

a pixel density designating step of designating a pixel density of an output apparatus;

a selecting step of selecting a pattern consisting of a plurality of pixels, the pattern having been stored in said dot pattern storage step, in accordance with the data level determined in said data level determination step and the pixel density designated in said pixel density designating step;

an error calculating step for calculating a difference between a representative value for each dot pattern and the error corrected data;

a storing step of storing the difference as error data into a memory.

17. A method according to claim 16, further comprising a binarizing step of binarizing the input multi-level data one pixel by one by an error diffusion method.

18. A method according to claim 16, wherein in said selecting step, a dot pattern is selected in accordance with the designated pixel density of the output apparatus so as to generate the dot pattern at the designated pixel density.

* * * * *

UNITED STATES PATENT AND TRADEMARK OFFICE
CERTIFICATE OF CORRECTION

PATENT NO. : 5,638,188

DATED : June 10, 1997

INVENTOR(S) : TAKAHIRO MORO ET AL.

It is certified that error appears in the above-identified patent and that said Letters Patent is hereby corrected as shown below:

COLUMN 1

Line 17, "a" (1st and 2nd occurrence) should be deleted.

COLUMN 5

Line 59, "an" should read --a--.

COLUMN 6

Line 33, "Judged" should read --judged--.

Signed and Sealed this

Sixteenth Day of December, 1997

Attest:

BRUCE LEHMAN

*Attesting Officer*     *Commissioner of Patents and Trademarks*